H. C. NEWCOMB.
STUFFED FRUIT.
APPLICATION FILED AUG. 15, 1914.

1,133,054. Patented Mar. 23, 1915.

Witnesses
John S. Wallace
Kate A. Beadle

Inventor
Horace C. Newcomb
by his Attorney
Harry Smith

UNITED STATES PATENT OFFICE.

HORACE C. NEWCOMB, OF PHILADELPHIA, PENNSYLVANIA.

STUFFED FRUIT.

1,133,054.   Specification of Letters Patent.   Patented Mar. 23, 1915.

Application filed August 15, 1914.   Serial No. 856,929.

*To all whom it may concern:*

Be it known that I, HORACE C. NEWCOMB, a citizen of the United States, residing in Philadelphia, Pennsylvania, have invented certain Improvements in Stuffed Fruits, of which the following is a specification.

My invention relates to fruits such as olives, plums, cherries and the like which, after being pitted, have the cavity stuffed with some edible substance or compound. Hereinafter, for convenience, I will refer to the fruit as an "olive."

One object of my invention is to prevent the loss of the stuffing or any part of it in the subsequent handling of the olive, and a further object is to prevent impairment of the external appearance of the olive by reason of the pitting and stuffing of the same.

Figure 1:
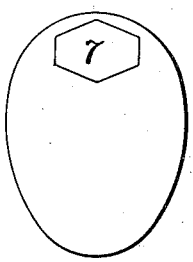
Figure 2:
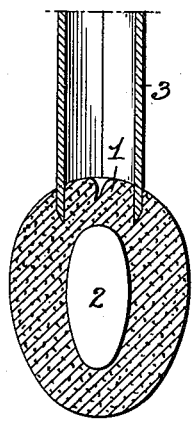
Figure 3:
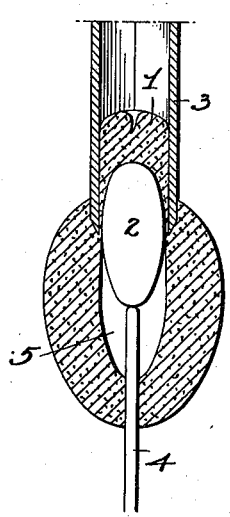
Figure 4:
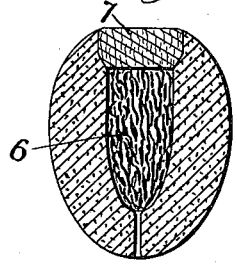

In the accompanying drawing Figure 1 is a perspective view of a stuffed olive prepared in accordance with my invention; Figs. 2 and 3 are sectional views illustrating successive steps in the operation of removing the pit from the olive, and Fig. 4 is a sectional view of the stuffed olive prepared in accordance with my invention.

In the present method of stuffing olives the pit is first removed from the fleshy portion of the fruit and in the cavity thus formed is inserted a folded strip of the fruit of the pepper plant, but the objections to this method are the liability to displacement or loss of the stuffing strip in the subsequent handling of the olive, and the impairment of the smooth external appearance of the olive when stuffed in this manner.

In carrying out my invention I first cut through the flesh 1 at one end of the olive above the pit 2 by means of a tubular cutter 3, as shown in Fig. 2, said cutter being preferably of hexagonal or other polygonal form for the reason hereinafter explained. By means of a plunger 4 passed through the flesh at the other end of the olive I then eject the pit 2 and the fleshy mass 1 above the same, as shown in Fig. 3, thereby leaving a cavity 5 which is afterward filled with a mass of some edible material or compound with which it is desired to stuff the olive. The mouth of the cavity is then closed by means of a plug 7 of some edible material, such for instance as the fruit of the pepper plant, this plug being of such size that it will completely fill the mouth of the cavity and will be retained in position by frictional contact with the walls of the same, so that it is not likely to be displaced by the handling to which the olive is subjected subsequent to the filling of the same. The surface of the plug also constitutes a continuation of the smooth external surface of the olive and therefore does not impair the attractive appearance of the same as does the folded portion of the strip usually employed as a stuffing.

The purpose of employing a tubular cutting knife and plug of hexagonal or equivalent polygonal form is to prevent waste in the cutting of the plugs from a strip of the edible material employed for the purpose, since it is evident that almost if not quite the entire area of the strip can be utilized in the production of such polygonal plugs, whereas plugs of circular or oval shape cannot be produced without a relatively high percentage of waste. Where this is not an important factor, however, plugs of circular or oval shape may be used.

I claim:

1. A stuffed fruit having the cavity originally occupied by the pit filled with edible stuffing material and having the mouth of said cavity closed by a plug of edible material which fits snugly to the walls of the cavity and is retained in position by frictional contact therewith.

2. A stuffed fruit having the cavity originally occupied by the pit filled with edible stuffing material, said cavity having a mouth of polygonal shape filled by a similarly shaped plug of edible material.

3. The mode herein described of preparing stuffed fruit, said mode consisting in cutting through the flesh of the fruit at one end of the same by means of a knife, then ejecting, by means of a plunger introduced at the other end of the fruit, the pit and the mass of flesh above the same, then stuffing with edible material the cavity formerly occupied by the pit, and then applying a plug of edible material to the mouth of said cavity.

4. The mode herein described of preparing stuffed fruit, said mode consisting in first cutting the flesh of the fruit at one end of the same by means of a tubular knife, then by means of a plunger introduced at the opposite end of the fruit ejecting the pit and the fleshy mass above the same, then stuffing with edible material the cavity formerly occupied by the pit, and then applying to the mouth of said cavity a plug of edible material of a shape similar to that of the tubular cutting knife.

In testimony whereof, I have signed my name to this specification, in the presence of two subscribing witnesses.

HORACE C. NEWCOMB.

Witnesses:
KATE A. BEADLE,
HAMILTON D. TURNER.